2,867,612

PROCESS FOR THE POLYMERIZATION OF ETHYLENE

Gustav Pieper and Eberhard Stein, Leverkusen, and Hans-Ferdinand Rickert, Koln-Stammheim, Germany, assignors to Farbenfabriken Bayer Aktiengesellschaft, Leverkusen, Germany, a corporation of Germany No Drawing. Application October 5, 1955
Serial No. 538,804

Claims priority, application Germany October 8, 1954

7 Claims. (Cl. 260—94.9)

The present invention relates to a process for the polymerization of ethylene.

In copending application Serial No. 512,564, Gustav Pieper et al., filed June 1, 1955, there is disclosed a process for the production of polymerization products of ethylene, which process consists in carrying out the polymerization of ethylene in the presence of a catalyst selected from the group consisting of titanium and zirconium compounds in which said metals display a lower valence than 3, such as more especially titanium dihalide and zirconium dihalide.

In a further development of the invention forming the basis of the said application, it has now been found that polymerization products of ethylene may also be obtained by polymerization of ethylene in the presence of mixtures of (1) titanium and zirconium compounds in which said metals display a lower valence than 3 and (2) compounds of alkali metals which contain an organic radical bonded to the metal by way of a carbon atom.

According to another embodiment of the process according to the invention, reaction mixtures of the said organic alkali metal compounds and titanium or zirconium tri- or tetrahalide can be used as polymerization catalysts, since titanium or zirconium tri- and tetrahalides react with the said organic alkali metal compound with formation of titanium or zirconium dihalide:

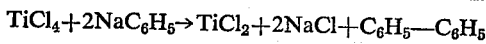

$$TiCl_4 + 2NaC_6H_5 \rightarrow TiCl_2 + 2NaCl + C_6H_5-C_6H_5$$

Suitable titanium and zirconium compounds for carrying out the process of the present invention are disclosed in copending application Serial No. 512,564, filed June 1, 1955.

Such compounds are especially the halides of said metals, preferably the chlorides, furthermore the bromides and iodides. As organic alkali metal compounds there may be used alkali metal alkyls, aralkyls, cycloalkyls, aryls, partially hydrogenated aryls such as sodium methyl, sodium ethyl, sodium amyl, sodium allyl, sodium octadecyl, sodium phenyl, potassium phenyl, potassium benzyl, sodium benzyl, sodium naphthyl, sodium fluoryl, sodium anisyl, lithium butyl, lithium cyclohexyl, lithium phenyl, lithium benzyl.

The catalyst mixtures may be prepared by mixing the above disclosed compounds of titanium and/or zirconium having a lower valence than 3 with the organic alkali metal compounds before or during the polymerization process. Suitable indifferent organic solvents such as aliphatic and aromatic hydrocarbons may be used for preparing suspensions or solutions of said catalysts. The relative amounts of the components of said catalyst mixtures may vary within wide limits. Since the organic alkali metal compounds react with contaminations such as moisture contained in the ethylene or the solvents under decomposition the amounts of said organic metal compounds depends on the purity of the components. Generally speaking the organic metal compounds are used in amounts varying from about 0.1–10 mols per 1 mol of titanium or zirconium catalyst. The latter compounds may be used in amounts of about 0.01–0.1 mol by weight per 100 g. polymerizate, although lower or higher proportions are also applicable.

As disclosed above suitable catalyst mixtures may also be obtained by reacting titanium and/or zirconium tri- or tetrahalides with a molar surplus of organic alkali metal compounds. The latter compounds may be used in quantities amounting to about 1.2–12 mols per 1 mol of tianium or zirconium compound. For carrying out this reaction of about 1.2–12 mols of organic alkali metal compounds are suspended or dissolved in about 1–10 litres of an indifferent anhydrous solvent while replacing the oxygen in the reaction vessel by nitrogen or another indifferent gas. Suitable solvents are for instance benzene, toluene, aliphatic hydrocarbons, cyclohexane. Thereafter the titanium or zirconium compounds such as titanium tetrachloride, titanium trichloride, zirconium tetrachloride are added slowly at room temperature within about 1–2 hours, whereby the reaction temperature may rise to about the boiling point of the organic solvent. There is obtained a suspension of the dihalides containing an unreacted surplus of organic metal compounds which latter may be either dissolved or suspended in the solvent. This reaction is preferably carried out before the catalysts are brought in contact with ethylene although it is also possible to carry out the reaction during the polymerization of ethylene.

The reaction conditions for carrying out the polymerization of ethylene in the presence of the above catalyst mixtures are substantially the same as those disclosed in copending application Serial No. 512,564 filed June 1, 1955. The catalyst mixtures used in the process according to the present invention are characterized by particularly high activity, so that high-molecular polymerization products of ethylene can already be obtained therewith under gentle conditions at temperatures of about 10–80° C.

The invention is further illustrated by the following examples without being restricted thereto.

Example 1

$\frac{1}{10}$ mol of titanium tetrachloride is added dropwise at room temperature and while stirring within a period of 30 minutes to about $\frac{4}{10}$ mol of sodium amyl suspended in commercial benzene.

The temperature of the reaction mixture then rises to about 45° C.; the result is a brownish black suspension, which no longer contains any titanium tetrachloride and which consists mainly of $TiCl_2$, sodium chloride and sodium amyl which is still in excess.

After introducing the catalyst suspension thus obtained into a stirrer-type autoclave of 0.7 litre and introducing ethylene under pressure to the limit of saturation, the autoclave is heated to 40° C. and ethylene is constantly forced in until the autoclave is almost completely filled with polymer.

The crude polymer can be worked up by mechanically comminuting the polymer to a suitable particle size (about 3–5 mm.) and extracting the material with alcohol or a mixture of alcohol and benzene in an extractor for several hours. Thereupon, the extracted material is briefly subjected to a stream of steam, washed with hot water and dried. In this manner, 272 parts by weight of an almost ash-free polyethylene is obtained, it is of advantage to carry out comminution and extraction with the exclusion of air.

The polyethylene thus obtained is distinguished by its high molecular weight and very good properties. It shows a softening point of about 175° C., a tensile strength of 231 kg./cm.² and can be cold-stretched by about 500%.

*Example 2*

A solution of 0.06 mol of titanium tetrachloride is caused to flow within 110 minutes and at a temperature in the region of 25° C. into a strongly centrifuged suspension of 0.2 mol of sodium phenyl in 120 parts by weight of commercial benzine and the mixture is heated for a further hour at 100° C.

The catalyst suspension of TiCl₂ which is thus obtained and which also still contains sodium phenyl is completely free from titanium tetrachloride and is particularly characterized by its excellent catalyst properties.

After the highly active suspension has been drawn by suction into a cold and absolutely dry stirrer-type autoclave of 0.07 litre which had previously been heated with great care, and after forcing in ethylene under pressure, the polymerization is immediately initiated at room temperature with progressive spontaneous heating after starting the stirrer mechanism. By quickly forcing in more ethylene, the reaction temperature is preferably brought to about 150° C., and more ethylene is introduced until the autoclave is almost entirely filled with polymer.

After working up, according to the process of Example 1, 254 g. of polyethylene having a softening point of about 180° C., and a tensile strength of about 200 kg./cm.² are obtained. The product can be stretched in the cold and in the heat by some 100%.

*Example 3*

If the sodium phenyl used in the above example is replaced by the equivalent amount of sodium amyl, there is obtained in analogous manner a catalyst which is likewise highly active and with which it is possible in a similar manner to transform ethylene into highly polymeric ethylene.

240 g. by weight of crude polymer are obtained from which 130 g. of pure polyethylene result after working up according to the process of Example 1. Tensile strength: 244 kg./cm.²; elongation at break: 175%.

*Example 4*

A solution of 9.5 parts of titanium tetrachloride in 50 parts of toluene is caused to flow at 25° C. and while stirring into 130 parts of toluene in which are suspended $\frac{2}{10}$ mol of sodium benzyl and the mixture is thereafter maintained for a further hour at 85–90° C.

A deep black suspension of TiCl₂ is obtained which also still contains sodium benzyl. It is completely free from titanium tetrachloride.

After introducing the catalyst suspension thus obtained into a stirrer-type autoclave of 0.7 litre, and with careful exclusion of atmospheric oxygen and moisture, ethylene is forced in at room temperature until the pressure remains constant. While heating the autoclave above 130–150° C., the polymerization of the ethylene is initiated and more ethylene is forced in until the autoclave is almost completely filled with polymer.

A polyethylene of high molecular weight and with very good properties is obtained.

*Example 5*

A catalyst suspension consisting of $\frac{1}{20}$ mol of titanium dichloride in paraffin oil (compare Example 8 of copending application Serial No. 512,564 filed June 1, 1955) is introduced by suction, together with $\frac{1}{15}$ mol of sodium amyl which is suspended in xylene, and with exclusion of air, into a previously thoroughly heated and absolutely dry stirrer-type autoclave consisting of stainless steel and is then saturated at room temperature with ethylene. While heating the autoclave to about 200° C., the polymerization is initiated and the ethylene used up is replaced by constantly re-introduced ethylene under pressure.

After working up as in Example 1 a high molecular weight polyethylene of a softening point of 189° C. is obtained.

*Example 6*

A catalyst suspension consisting of $\frac{1}{30}$ mol of titanium dichloride and prepared in paraffin oil is introduced with suction with $\frac{1}{10}$ mol of sodium phenyl which is suspended in toluene into an absolutely dry stirrer-type autoclave made of stainless steel and with exclusion of air. After saturating the contents of the autoclave with ethylene at a pressure of 60 atm., the autoclave is heated to 150° C., and ethylene is constantly introduced under pressure.

After working up as in Example 1 a high molecular weight polyethylene of excellent properties is obtained in a very good yield. Softening point: 230° C.; tensile strength: 96 kg./cm.²; elongation at break: about 400%.

*Example 7*

$\frac{1}{30}$ mol of a TiCl₂ suspension in paraffin oil is introduced with a suspension of $\frac{1}{15}$ mol of sodium benzyl in commercial benzine under the usual precautionary measures into a stainless steel autoclave equipped with stirrer mechanism, raised while cold to a pressure of about 60 atm. with ethylene, and is then heated to about 150° C. The necessary ethylene concentration is maintained by forcing in more ethylene.

A polyethylene of high molecular weight and having very good properties is obtained.

Softening point: about 190%; tensile strength: 248 kg./cm.²; elongation at break: 660%.

*Example 8*

$\frac{1}{10}$ mol of zirconium tetrachloride is introduced at room temperature into a centrifuged suspension of $\frac{4}{10}$ mol of sodium phenyl in commercial benzine, the mixture is stirred for three hours at room temperature and thereafter for another 8 hours at 100° C.

The suspension, which is now deep black and which substantially contains zirconium dichloride, sodium chloride and excess sodium phenyl, is introduced with the usual precautionary measures into a stirrer-type autoclave of 0.7 litre. After ethylene has been forced in to the limit of saturation, the stirrer-type autoclave is heated to 100° C. to the point of commencement of polymerization of the ethylene and ethylene is continuously introduced at this temperature until the autoclave is almost completely filled with polymer.

The polymer obtainable in this manner is distinguished by its high molecular character from the more wax-like polymers such as are obtained with ZrCl₂ by itself. It can be molded and worked by the die-casting process. Furthermore, owing to its linear structure, it can be highly stretched.

*Example 9*

A similar polyethylene also of high molecular weight, is obtained if zirconium tetrachloride is not reduced with sodium phenyl as described in the preceding example, but if sodium phenyl or sodium amyl is added to prepared ZrCl₂ and these mixtures are used as catalysts.

*Example 10*

9.2 g. of sodium wire are forced at room temperature in a nitrogen atmosphere into 200 cc. of anhydrous benzene and a mixture of 22 g. of chlorobenzene and 19.2 g. of titanium tetrachloride is added dropwise while stirring. Upon heating to 50–70° C., the sodium gradually precipitates as a black powder.

The suspension of this powder absorbs about 130 g. of ethylene in an autoclave at 50° C. and 70 atm. with spontaneous heating. After completion of the reaction, the polymer which is formed can be freed from inorganic constituents of low molecular weight by heating to 150° C. with methanol and water under pressure and then forms a yellowish lump. Yield: 107 g.

Example 11

(a) In a stirring vessel of Jena glass, a solution of 5 g. of naphthalene in 500 cc. of commercial benzine is heated to 100° C. with the exclusion of air and 23 g. (1.0 mol) of sodium metal are emulsified in the liquid by means of a vibration stirrer. To the weakly green colored emulsion there is added in drops within one hour a solution of 95 g. (0.5 mol) of titanium tetrachloride and the mixture is kept at 100° C. for another hour. The precipitated black finely pulverized mass is filtered off with suction with the exclusion of air, washed and stored under petroleum ether.

20 g. of the wet contact material (=10 g. of dry material) are suspended with 260 cc. of petroleum ether in an autoclave of 0.75 litre and treated with ethylene at 50° C. at a pressure of 60 atm. The immediately initiated polymerization is maintained by gradually heating to 200° C. After the gas absorption is complete (totally 65 atm.) the reaction product precipitates on cooling and is substantially freed from inorganic constituents by heating with methanol containing ammonia to 200° C. under pressure. The yield is 80 g. The product molded into a grey resilient sheet has a tear resistance of 230 kg./cm.$^2$ and an elongation at break of 220%.

(b) To an emulsion of 11.5 g. (0.5 mol) of sodium metal in 0.5 litre of commercial benzine there is added in portions at 190° C. 83 g. (0.5 mol) of fluorene. After the gradual addition in drops of a solution of 4 g. (0.25 mol) of titanium tetrachloride in 50 cc. of commercial benzine a black, finely divided mass precipitates which is separated from the supernatant crude yellow solution by decanting and washing.

The precipitated product is suspended with 260 cc. of commercial benzine and treated in an autoclave of 0.75 litre with ethylene at 100–120% and 70 atm. The gas which is used up is constantly replaced by introducing more ethylene until the reaction stops after the absorption of 258 atm. The black, highly viscous contents of the autoclave are pulverized and heated with methanol containing ammonia and then with dilute caustic soda solution under pressure to 200–250° C. The product does not melt at this temperature but can be pressed at 200° C. into a grey resilient sheet and has then a tear resistance of 225 kg./cm.$^2$ and an elongation at break of 365%. Yield: 185 g.

(c) To an emulsion of 23 g. of sodium in 500 cc. of methyl cyclohexane there are added in drops 54 g. of anisol with the exclusion of air and stirring with a vibration mixer at 75° C. After 2½ hours the mixture has become dark colored and contains some colorless precipitate. Upon addition of 4 g. of titanium tetrachloride dissolved in 50 cc. of methyl cyclohexane, the solution becomes yellowish red-colored and a dark mass precipitates. After filtering off and washing with methyl cyclohexane, 20 g. of this wet catalyst are suspended in 250 cc. of methyl cyclohexane in an autoclave and treated with ethylene at 130–140° C. and 70 atm. After the absorption of totally 251 atm., the black viscous mass is comminuted and substantially freed from inorganic constituents by boiling with alcohol. Yield: 130 g.; tear resistance: 193 kg./cm.$^2$; elongation at break: 400%.

Example 12

When proceeding as described in the preceding example replacing, however, the contact material by a mixture of 0.1 mol of titanium dichloride and 0.02 mol of lithium phenyl, 220 g. of crude polymer are obtained at an ethylene pressure of about 60 atm. at 160° C. After working up according to Example 1 the polyethylene obtained has a softening point of 135–138° C.

Example 13

A catalyst mixture of 0.1 mol of titanium dichloride and 0.014 mol of lithium butyl suspended in 100 g. of benzene is introduced into a stirrer-type autoclave of 0.7 litre; ethylene is forced in at a pressure of 60 atm.; the mixture is heated to 160° C. By continuously introducing more ethylene the gas concentration is kept as constant as possible. After 8½ hours the autoclave is almost completely filled with polymer.

By working up the crude polymer (420 g.) according to Example 1 300 g. of a polyethylene of a softening point of 165° C. are obtained. Tear resistance: 290 kg./cm.$^2$; elongation at break: 760–780%.

Instead of the above catalyst, the mixture may be used which is obtained by reacting 0.1 mol of titanium tetrachloride with slightly more than 0.2 mol of a lithium-butyl solution in benzene.

Example 14

When proceeding as described in the foregoing example replacing, however, the catalyst by a mixture of 0.1 mol of titanium dichloride and 0.025 mol of lithium-benzyl, 280 g. of a crude polymer are obtained in 8 hours. The polyethylene obtained from the crude polymer by working up according to Example 1 has a softening point of 141° C., a tear resistance of 206 kg./cm.$^2$, and can be stretched by about 400–500%.

Example 15

A catalyst suspension consisting of 0.1 mol of titanium dichloride in 100 g. of methyl cyclohexane and about 0.1 mol of sodium allyl (prepared according to J. Am. Chem. Soc. 69, 950 (1947) by reacting sodium amyl with propylene) is introduced with the exclusion of air and moisture into a previously thoroughly heated and absolutely dry stirrer-type autoclave of 0.7 litre. After forcing in ethylene under pressure of 60 atm., polymerization starts immediately at room temperature, whereby the temperature of the autoclave spontaneously rises to 60° C. By continuously introducing more ethylene, the temperature is brought to about 105° C. and kept at this temperature during polymerization. After working up the polymer according to Example 1, 280 g. of polyethylene of a softening point of about 210–220° C. are obtained.

Example 16

200 g. of methyl cyclohexane and a catalyst mixture consisting of 0.05 mol of titanium dichloride and about 0.05 mol of sodium phenyl are introduced into a stirrer-type autoclave after removing the nitrogen used for removing the air, ethylene is forced in at 40 atm. Polymerization starts at 23° C. The temperature in the autoclave is allowed to rise to 55° C. with continuous self-heating. During the first 4 hours of polymerization the ethylene pressure is kept at about 40 atm. by continuously introducing more ethylene and is increased to 72 atm. towards the end of polymerization. After 20 hours the ethylene absorption amounts to 356 atm. and 400 g. of a crude polymer are obtained in form of a sandy powder. Because of its fine distribution the crude polymer can be worked up conveniently and 135 parts of pure polyethylene are obtained (softening point 210–230° C.); 570 kg./cm.$^2$; elongation at break: 200–300%.

Example 17

288 g. of octadecyl chloride are carefully introduced with vigorous centrifuging at 110° C. within 2–3 hours into a highly dispersed sodium emulsion of 48 g. of sodium in 1200 g. of paraffin oil. The reaction mixture is stirred for 15 minutes at a velocity of 8000–10,000 revolutions per minute and is made up to 1800 cc. by addition of more paraffin oil. An almost snow-white paste of octadecyl sodium is obtained provided that the process was carried out with careful exclusion of air and moisture.

About 0.2 mol of the sodium alkyl thus obtained is gradually mixed with vigorous stirring at 145–150° C. within 2 hours with 0.05 mol of titanium tetrachloride and the mixture is allowed to col while stirring. The cooled catalyst mixture is introduced into a stirrer-type autoclave of 0.7 litre, ethylene is forced in at about 60 atm., the mixture is carefully heated. Polymerization sets in at about 50° C. and is completed by continuously forcing in more ethylene at 145° C.

After working up according to Example 1, 134 g. of polyethylene having a softening point of 220° C. are obtained.

*Example 18*

Ethylene is forced into a stirrer-type autoclave of 0.7 litre containing a catalyst mixture of 0.1 mol of titanium dichloride and 0.2 mol of cyclopentadienyl sodium (prepared by dropping cyclopentadiene into a highly dispersed sodium emulsion in methyl cyclohexane at 98–100° C.) and the mixture is carefully heated. Polymerization sets in at about 50° C. and is completed at 175° C.

98 g. of a crude polymer are obtained.

What we claim is:

1. A process for the production of polymerization products of ethylene which comprises maintaining the ethylene in an inert medium at temperatures ranging between about 10° and 400° C., in contact with a catalyst mixture obtained by reacting (1) a compound selected from the group consisting of titanium tetrachloride, titanium trichloride, and zirconium tetrachloride, with (2) a compound of an alkali metal selected from the group consisting of lithium, sodium, and potassium which contains an organic radical of 1–18 carbon atoms bonded to the metal through a carbon atom, said alkali metal being the sole metal present in the compound; said alkali metal compound being employed in quantities of about 1.2–12 moles per 1 mole of said metal halide.

2. Process according to claim 1, wherein zirconium tetrachloride is used for producing the catalyst mixture.

3. Process according to claim 1, wherein titanium tetrachloride is used for producing the catalyst mixture.

4. A process for the production of polymerization products of ethylene which comprises maintaining the ethylene in an inert medium in contact with a catalyst mixture comprising (1) a compound of an alkali metal selected from the group consisting of sodium, lithium, and potassium, which contains an organic radical of 1–18 carbon atoms bonded to the metal by way of a carbon atom, said alkali metal being the sole metal present in the compound, and (2) a compound selected from the group consisting of titanium dichloride and zirconium dichloride, said alkali metal compound being present in quantities of about 0.1–10 moles per 1 mole of said metal halide.

5. Process according to claim 4, wherein the compound (2) is titanium dichloride.

6. Process according to claim 4, wherein the compound (2) is zirconium dichloride.

7. A process according to claim 4, wherein said metal halide is applied in an amount of 0.01–0.1 mole per 100 g. of ethylene polymerizate.

References Cited in the file of this patent

UNITED STATES PATENTS

| | | |
|---|---|---|
| 2,567,109 | Howard | Sept. 4, 1951 |
| 2,721,189 | Anderson et al. | Oct. 18, 1955 |

FOREIGN PATENTS

| | | |
|---|---|---|
| 533,362 | Belgium | May 16, 1955 |